US009083780B2

(12) United States Patent
Miura et al.

(10) Patent No.: US 9,083,780 B2
(45) Date of Patent: Jul. 14, 2015

(54) ELECTRONIC DEVICE, SCREEN CONTROL METHOD, AND SCREEN CONTROL PROGRAM

(75) Inventors: Hiroaki Miura, Yokohama (JP); Tomoko Asano, Yokohama (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 101 days.

(21) Appl. No.: 13/812,727

(22) PCT Filed: Jul. 28, 2011

(86) PCT No.: PCT/JP2011/067353
§ 371 (c)(1),
(2), (4) Date: Jan. 28, 2013

(87) PCT Pub. No.: WO2012/015005
PCT Pub. Date: Feb. 2, 2012

(65) Prior Publication Data
US 2013/0122968 A1    May 16, 2013

(30) Foreign Application Priority Data
Jul. 28, 2010    (JP) .................. 2010-169884

(51) Int. Cl.
G06F 3/033    (2013.01)
G09G 5/08    (2006.01)
H04M 1/02    (2006.01)
G01C 22/00    (2006.01)
H04M 1/725    (2006.01)

(52) U.S. Cl.
CPC .......... *H04M 1/0266* (2013.01); *G01C 22/006* (2013.01); *H04M 1/72544* (2013.01); *H04M 2250/12* (2013.01)

(58) Field of Classification Search
CPC ................. H04M 2250/12; H04M 1/72522; G01C 22/006; A61B 2562/0219; A63F 2300/105; A63F 2300/204; G06F 1/1626; G06F 3/0346; G06F 3/04817; G06F 3/0482; H04W 4/027
USPC .................................. 345/156–178
See application file for complete search history.

(56) References Cited

U.S. PATENT DOCUMENTS

2004/0116158 A1*  6/2004  Rytivaara et al. ............. 455/566
2006/0073807 A1*  4/2006  Baker .......................... 455/405
2006/0143574 A1*  6/2006  Ito et al. ....................... 715/800

FOREIGN PATENT DOCUMENTS

| JP | 7-250363 A | 9/1995 |
| JP | 8-051654 A | 2/1996 |
| JP | 2000-116630 A | 4/2000 |
| JP | 2000-209142 A | 7/2000 |
| JP | 2001-257746 A | 9/2001 |

(Continued)

OTHER PUBLICATIONS

International Search Report and Written Opinion corresponding to PCT/JP2011/067353, dated Sep. 13, 2011.

*Primary Examiner* — Stephen Sherman
(74) *Attorney, Agent, or Firm* — Lowe Hauptman & Ham, LLP

(57) ABSTRACT

According to an aspect, an electronic device includes: a display unit; and a control unit for acquiring information related to a process of an application program being executed in background and, executing an operation repeatedly to display the acquired information as additional information on the display unit.

10 Claims, 8 Drawing Sheets

(56) References Cited

FOREIGN PATENT DOCUMENTS

| JP | 2005-051427 | A |   | 2/2005 |
| JP | 2005-110059 | A |   | 4/2005 |
| JP | 2009266071 | A | * | 11/2009 |
| JP | 2010-015232 | A |   | 1/2010 |

* cited by examiner

FIG.6

| ID | Display Position | Program | Additional Information | Status | Repetition | Parameter |
|---|---|---|---|---|---|---|
| 1 | 3 | Browser | News | Symbol+Additional Information | Not Set | http://aaa.bbb/ |
| 2 | 4 | Pedometer | <Dynamic> | Hidden | Daily | 10000 steps |
| 3 | 5 | Navigation | <Dynamic> | Symbol+Additional Information | Not Set | xx.xxxxxx, yy.yyyyyy |
| ... | ... | ... | ... | ... | ... | ... |

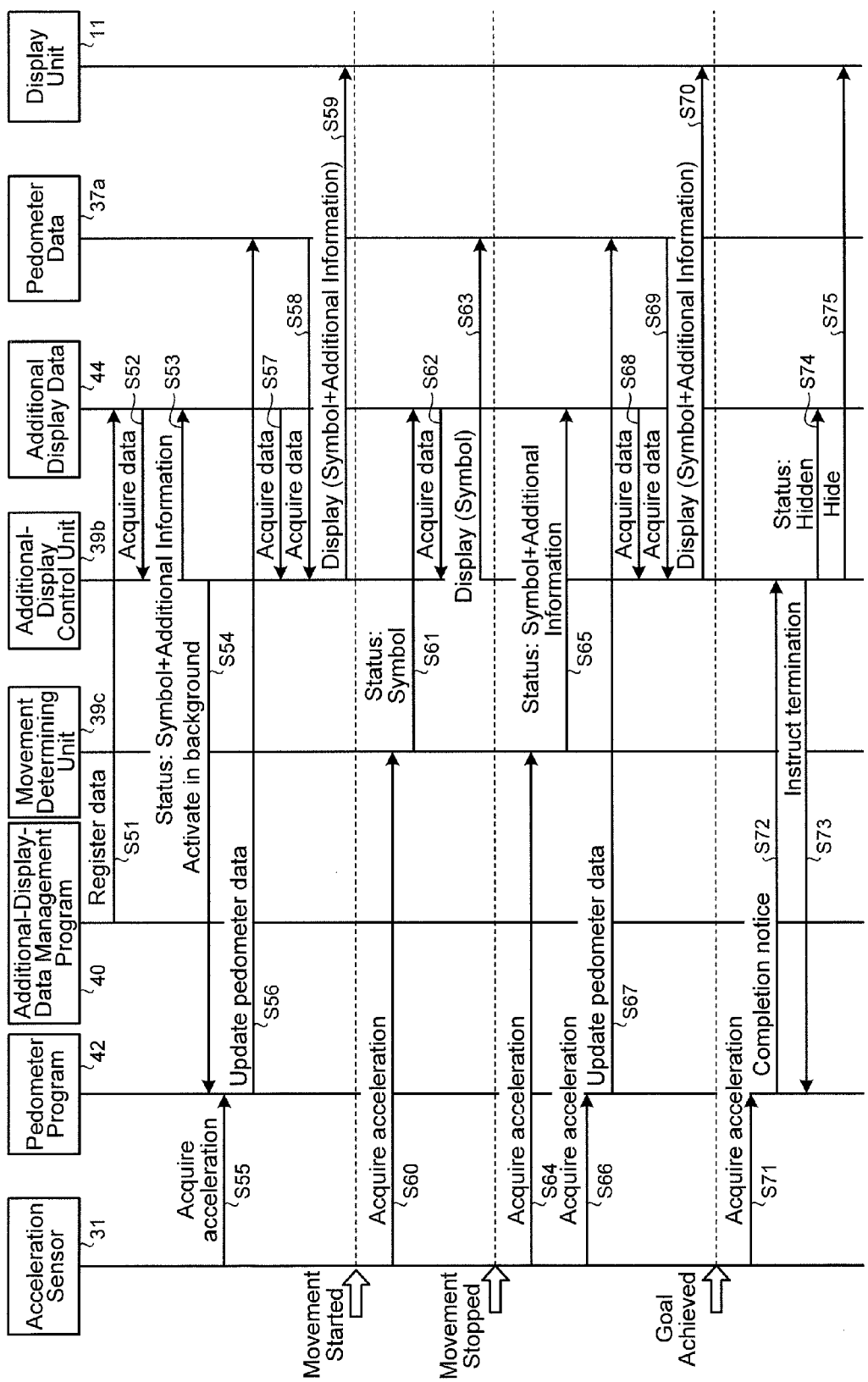

ELECTRONIC DEVICE, SCREEN CONTROL METHOD, AND SCREEN CONTROL PROGRAM

CROSS-REFERENCE TO RELATED APPLICATION

This application is a National Stage of PCT international application Ser. No. PCT/JP2011/067353 filed on Jul. 28, 2011 which designates the United States, and which is based upon and claims the benefit of priority from Japanese Patent Application No. 2010-169884, filed on Jul. 28, 2010.

FIELD

The present disclosure relates to an electronic device, a screen control method, and a screen control program.

BACKGROUND

There is a known technology for displaying additional information related to a specific application program on an idle screen of an electronic device such as a mobile phone (e.g., see Patent Literature 1). By using this technology, for example, a function can be realized, in which additional information including a character string "weather forecast" is displayed on an idle screen, and a browser is activated to display a WEB page of weather forecast when a predetermined operation is performed with the additional information selected.

By using such a technology, a desired application program can be quickly activated without performing a complicated operation such as following a menu hierarchy from the idle screen to activate the desired application program.

CITATION LIST

Patent Literature

Patent Literature 1: JP-A-2005-110059

Technical Problem

In the conventional technology, however, a previously fixedly set character string is displayed as additional information on the idle screen. Therefore, a portion of the idle screen is occupied by the fixedly set character string, so that the idle screen being a limited space cannot be effectively used.

For the foregoing reasons, there is a need for an electronic device, a screen control method, and a screen control program capable of making more effective use of an idle screen.

SUMMARY

According to an aspect, an electronic device includes: a display unit; and a control unit for acquiring information related to a process of an application program being executed in background and, executing an operation repeatedly to display the acquired information as additional information on the display unit.

According to another aspect, a screen control method is executed by an electronic device having a display unit. The screen control method includes: acquiring information related to a process of an application program being executed in background; and executing an operation repeatedly to display the acquired information as additional information on the display unit.

According to another aspect, a screen control program causes an electronic device having a display unit to execute: acquiring information related to a process of an application program being executed in background; and executing an operation repeatedly to display the acquired information as additional information on the display unit.

Advantageous Effects of Invention

The electronic device, the screen control method, and the screen control program according to the present invention can make more effective use of the idle screen.

BRIEF DESCRIPTION OF DRAWINGS

FIG. 6 is a diagram illustrating an example of additional display data.
FIG. 9 is a sequence diagram illustrating an operation of the mobile phone when information related to the process of a pedometer program is displayed as additional information on the idle screen.

DESCRIPTION OF EMBODIMENTS

Examples of the electronic device, the screen control method, and the screen control program according to the present invention will be explained in detail below with reference to the accompanying drawings. It should be noted that the present invention is not limited by the examples. In addition, the components in the explanation below include those which are easily thought of by persons skilled in the art, those which are substantially identical, and those in a scope of so-called equivalents. In the following explanation, a mobile phone is discussed as an example of the electronic device; however, a target to which the present invention is applied is not limited to the mobile phone. Therefore, the present invention is also applicable to, for example, PHSs (Personal Handyphone System), smartphones, PDAs (personal digital assistant), portable navigation devices, notebook computers, and gaming devices.

Embodiment

Figure 1:
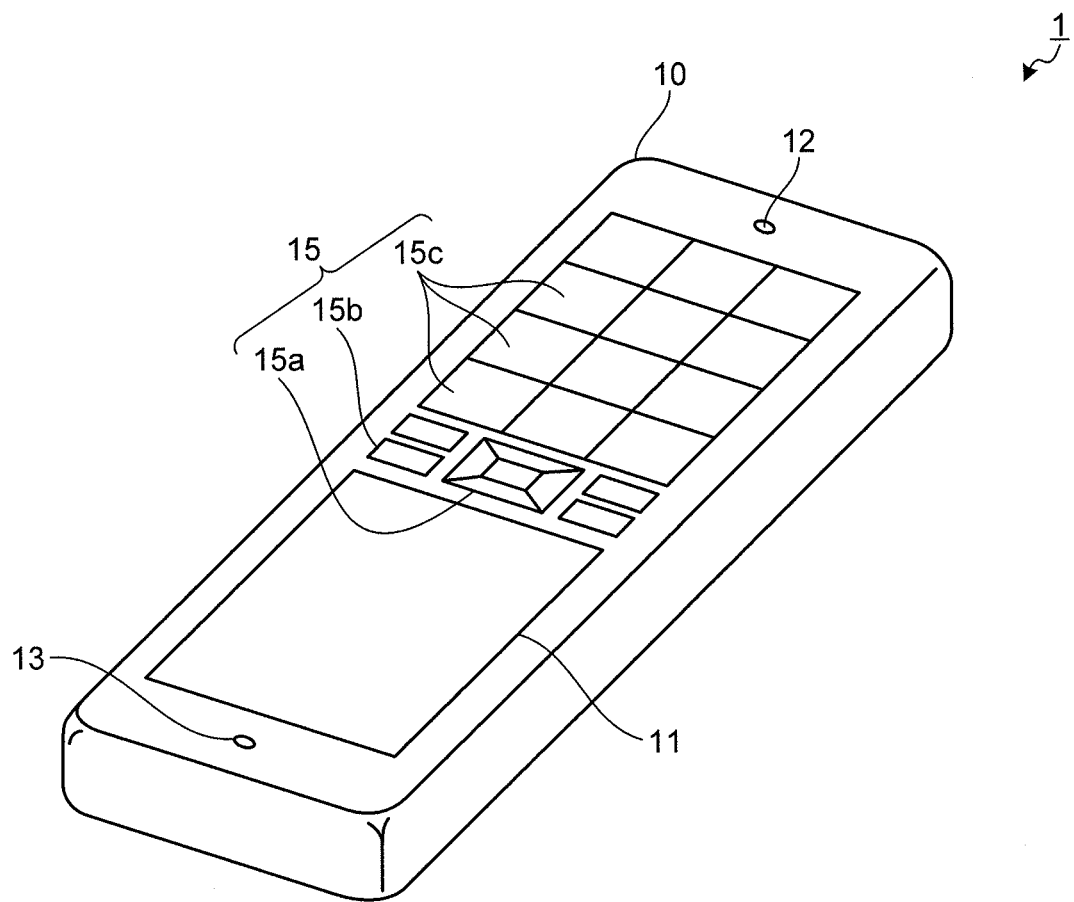
FIG. 1 is a perspective view of an appearance of a mobile phone.

First of all, an appearance of a mobile phone 1 according to the present embodiment will be explained. FIG. 1 is a perspective view of the appearance of the mobile phone 1. As illustrated in FIG. 1, the mobile phone 1 includes a housing 10, a display unit 11, a microphone 12, a receiver 13, and an input unit 15.

The housing 10 is formed into, for example, a single box shape. The housing 10 is a so-called straight type housing. The housing 10 may include, for example, two housings: a first housing and a second housing. In this case, the housing 10 may be a slide type housing in which the first housing slides with respect to the second housing, or may be a folding type housing in which the first housing pivots with respect to the second housing. In other words, the configuration of the housing 10 is not limited.

The display unit 11, the microphone 12, the receiver 13, and the input unit 15 are provided in the housing 10. The microphone 12 converts a sound to an electrical signal. The receiver 13 converts an electrical signal to a sound and outputs the sound.

The input unit 15 receives a user's operation and generates a signal according to the received operation. The input unit 15 includes a direction button 15a, functions call buttons 15b each as a function calling unit, and number input buttons 15c. The direction button 15a is a button for moving a cursor appearing on the display unit 11. The functions call buttons 15b are buttons for calling various functions provided in the mobile phone 1. The number input buttons 15c are buttons for inputting numbers. The number input buttons 15c are buttons used to enter a phone number when, for example, a voice call is started.

The display unit 11 is provided with a display panel such as an LCD (Liquid Crystal Display) or an OEL (Organic Electro-Luminescence) panel. The display unit 11 displays a various function screen, an idle screen, and so on. The function screen is a screen for providing functions included in the mobile phone 1 to the user. Included in the function screens are screens for providing functions, to the user, such as a verbal communication function with other mobile phone, a mail transmission/reception function, an imaging function performed by a camera, and an audio visual function.

The idle screen is a screen in a state in which incoming and outgoing calls are awaited, or a screen in a state in which activation of an application program is awaited. In other words, the idle screen is a screen before the screen is changed to the various function screens provided by the mobile phone 1. The idle screen is sometimes called, for example, "desktop screen", "home screen", or "wallpaper".

The mobile phone 1 displays additional information on the idle screen in a superimposed manner according to additional display data set by the user. Registered in the additional display data are information to be displayed as additional information, information for specifying an application program to be activated, and parameters of the application program, which are associated with each other. The information to be displayed as additional information includes, for example, character strings, images, graphics, or a combination thereof.

The additional information is displayed in, for example, a band-like area separately provided on the idle screen. The mobile phone 1 can simultaneously display a plurality of pieces of additional information on the idle screen. The mobile phone 1 then activates an application program associated with additional information according to a user's operation performed for the additional information displayed on the idle screen.

The mobile phone 1 can display any information, as well as the fixedly set information, being processed by the application that is executed in the background on the idle screen as additional information according to the additional display data set by the user.

Figure 2:
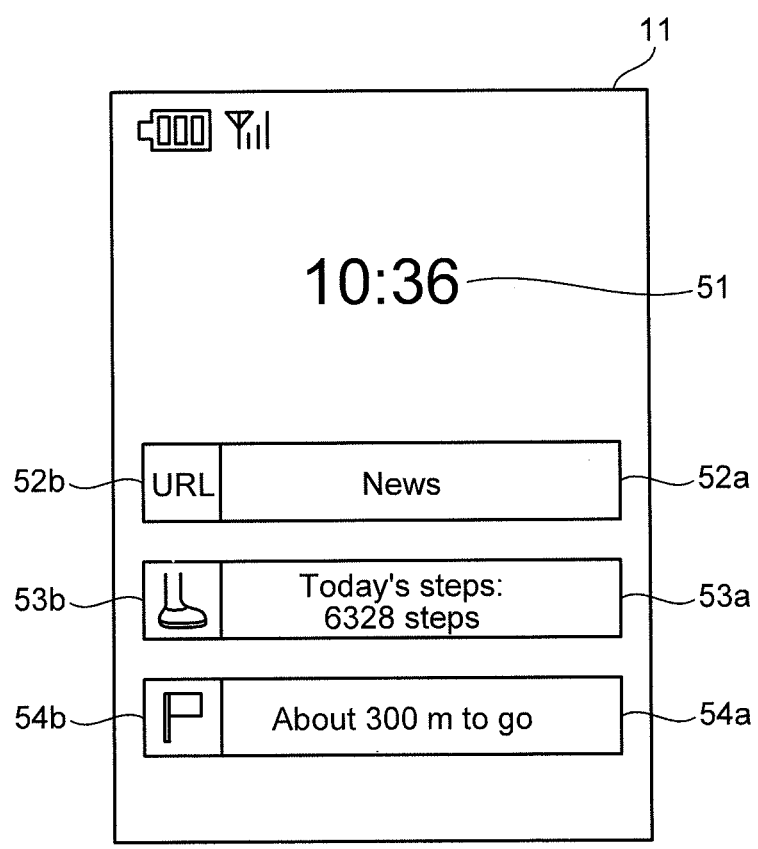
FIG. 2 is a diagram illustrating an example of an idle screen displayed by the mobile phone.

An example of the idle screen that the mobile phone 1 displays on the display unit 11 is represented in FIG. 2. FIG. 2 is a diagram illustrating an example of the idle screen displayed by the mobile phone 1. In the example of FIG. 2, clock 51 is displayed as a portion of the idle screen. In the example of FIG. 2, additional information 52a, additional information 53a, and additional information 54a are displayed on the idle screen in a superimposed manner.

The additional information 52a includes a character string "News" that is fixedly set. In the additional display data corresponding to the additional information 52a, a browser program is specified as an application program to be activated, a URL of a news site is specified as a parameter, and the character string "News" is specified as additional information.

The user selects the additional information 52a displayed on the idle screen through an operation of the direction button 15a or so and executes a decision operation, which enables activation of the browser program while the URL of the news site is specified as a destination to be accessed. In this way, the additional information displayed on the idle screen is used to quickly activate the application program associated therewith.

The additional information 53a includes a character string "Today's steps: 6328 steps" that is dynamically generated. In the additional display data corresponding to the additional information 53a, a pedometer program for counting the number of user's steps is specified as application programs to be activated, the number of goal steps per day is specified as a parameter, and an instruction to update the additional information as needed is specified.

The additional information 54a includes a character string "About 300 m to go" that is dynamically generated. In the additional display data corresponding to the additional information 54a, a navigation program is specified as application programs to be activated, a latitude and a longitude of the destination is specified as a parameter, and an instruction to update the additional information as needed is specified. The navigation program is an application program for guiding the user to a destination based on a base station to which the mobile phone 1 is being connected or based on a GPS (Global Positioning System) receiver or so.

The additional information 53a and the additional information 54a are updated according to the processes of the application programs that operate in the background respectively. Specifically, the additional information 53a is updated according to the number of user's steps counted by the pedometer program. The additional information 54a is updated according to the distance to the destination calculated by the navigation program.

In this way, the additional information displayed on the idle screen is also used to show the user the latest information related to various application programs that operate in the background with the idle screen displayed. With the idle screen displayed, the information related to the process of the application program that operates in the background is displayed on the idle screen in a superimposed manner, thus making more effective use of the idle screen being the limited space.

As illustrated in FIG. 2, the mobile phone 1 displays symbols (pictograms) 52b, 53b, and 54b associated with the additional information 52a, 53a, and 54a respectively at respective left edges of the band-like areas in which the additional information 52a, 53a, 54a are displayed. The symbols 52b, 53b, and 54b indicate that character strings or so displayed in respective right sides of the band-like areas are additional information based on the preset additional display data.

A symbol displayed in association with each additional information includes an image, a graphic, or a text or so. The symbol may be called "icon". The symbol preferably includes an image, a graphic, a text, or so, which is different from each other for each application program so that the user can easily recognize a correspondence between the additional information and the application program to be activated.

In the example of FIG. 2, the symbol 52b includes characters "URL" so that the user can easily recognize that the application program to be activated is the browser program. The symbol 53b includes a graphic representing a foot so that the user can easily recognize that the application program to be activated is the pedometer program. The symbol 54b includes a graphic representing a flag that indicates a destination so that the user can easily recognize that the application program to be activated is the navigation program.

Which symbol is to be displayed and which additional information is to be associated with the symbol may be determined according to an application program associated with the additional information, or may be determined based on a user's selection.

Figure 3:
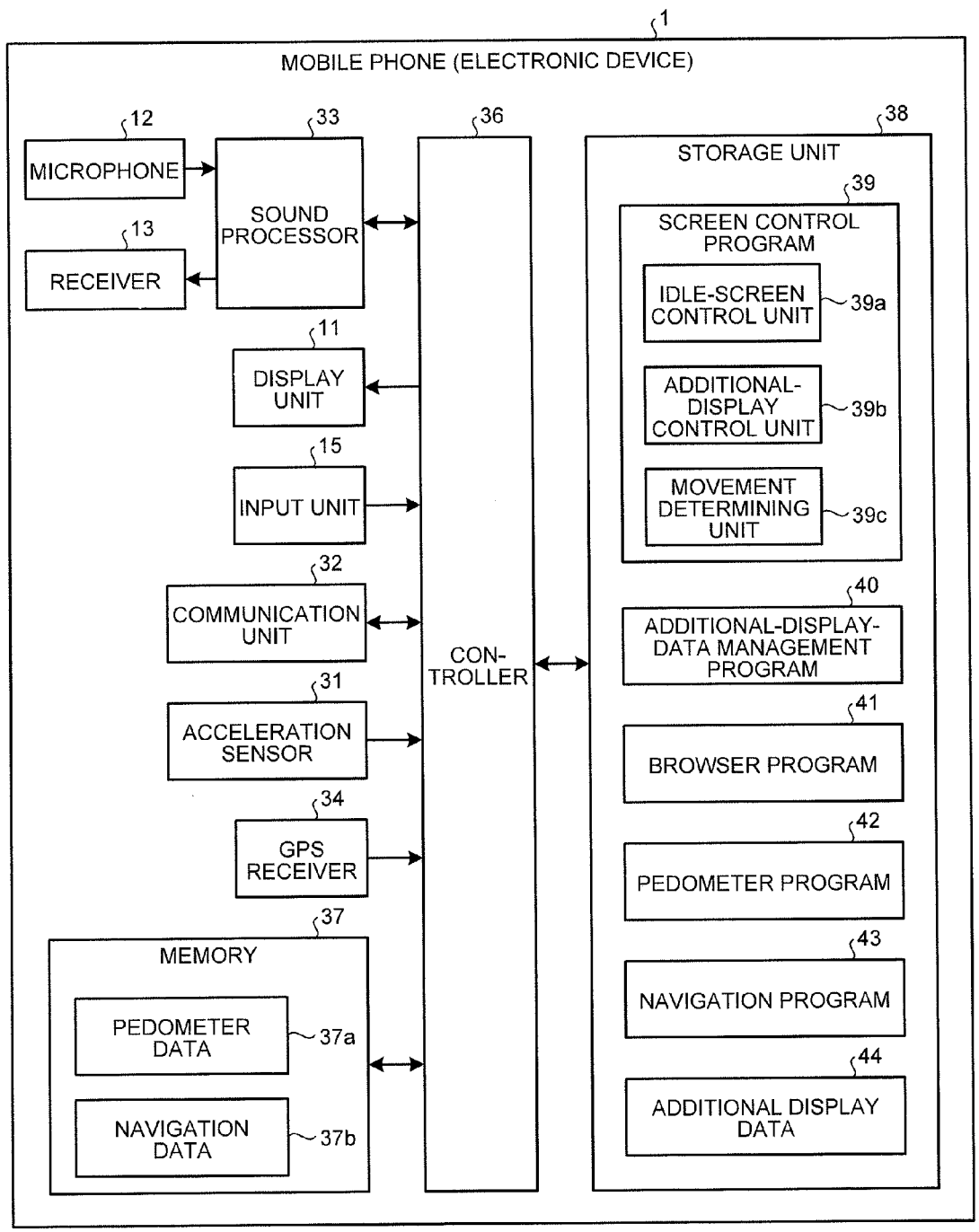
FIG. 3 is a block diagram of a functional configuration of the mobile phone.

Then, a functional configuration of the mobile phone 1 illustrated in FIG. 1 will be explained below. FIG. 3 is a block diagram of the functional configuration of the mobile phone 1. As illustrated in FIG. 3, the mobile phone 1 includes the display unit 11, the microphone 12, the receiver 13, the input unit 15, an acceleration sensor 31, a communication unit 32, a sound processor 33, a GPS receiver 34, a controller 36, a memory 37, and a storage unit 38.

The acceleration sensor 31 detects an acceleration applied to the mobile phone 1. The communication unit 32 includes an antenna which is not illustrated, and establishes a wireless path with a base station to implement a wireless communication for telephone communication and data communication. The sound processor 33 subjects sound data converted into an electrical signal by the microphone 12 to a process such as encoding and outputs the encoded sound data to the controller 36. In addition, the sound processor 33 subjects the sound data input from the controller 36 to a process such as decoding and outputs the decoded sound data to the receiver 16. The GPS receiver 34 receives an electric wave from a satellite to specify a current location.

The controller 36 integrally controls the overall operation of the mobile phone 1. Specifically, the controller 36 includes a processing device such as a CPU (Central Processing Unit) which is not illustrated. The controller 36 causes the processing device to execute a processing process based on instructions and data included in various programs such as an operating system and application programs. The controller 36 controls the units of the mobile phone 1 based on the result of the processing process of the processing device. The controller 36 controls the units to thereby implement various functions such as a voice communication function and a mail transmission/reception function that the mobile phone 1 provides to the user.

The operating system executed by the controller 36 has a multi-task function. Therefore the controller 36 can simultaneously execute a plurality of application programs in a pseudo manner. That is, the controller 36 executes an application program in a foreground and displays a function screen provided by the application program on the display unit 11. Moreover, the controller 36 can execute other application program in the background with the idle screen displayed without displaying a function screen provided by the application program on the display unit 11.

The memory 37 is, for example, RAM (Random Access Memory). The memory 37 is used as a storage area to which data used in various processing processes to be executed by the controller 36 is temporarily loaded. The memory 37 may also be used as a storage area to which an application program being executed by the controller 36 is temporarily loaded. Instead of providing the memory 37, the storage unit 38 may also serves as a function of the memory 37.

The storage unit 38 is a nonvolatile storage device (e.g., flash memory). The storage unit 38 stores therein data and programs used for the various processing processes executed by the controller 36. The programs stored in the storage unit 38 include a screen control program 39, an additional-display-data management program 40, a browser program 41, a pedometer program 42, and a navigation program 43. The data stored in the storage unit 38 includes additional display data 44.

The screen control program 39 implements various functions related to the idle screen displayed on the display unit 11. The screen control program 39 includes an idle-screen control unit 39a, an additional-display control unit 39b, and a movement determining unit 39c. Each of the idle-screen control unit 39a, the additional-display control unit 39b, and the movement determining unit 39c includes a set of instructions and data that causes the controller 36 to implement a predetermined function.

The idle-screen control unit 39a displays the idle screen on the display unit 11. The idle screen displayed by the idle-screen control unit 39a may sometimes include a portion, as the clock 51 in the example illustrated in FIG. 2, that dynamically changes by the function provided by the idle-screen control unit 39a in addition to a background portion formed from previously selected image data, animation data, etc.

The additional-display control unit 39b displays additional information on the idle screen based on the additional display data 44. The additional-display control unit 39b also activates the application program associated with the additional information according to an operation performed for the additional information displayed on the idle screen.

The additional-display control unit 39b displays, as additional information, information fixedly set in the additional display data 44 or information dynamically generated by the application program specified in the additional display data 44 on the idle screen. A display position of the additional information is set to a position that the user likes through an operation performed for the input unit 15. The display of the information dynamically generated by the application program is implemented in the following manner.

First of all, if an application program that dynamically generates information to be displayed as additional information on the idle screen is not activated, the additional-display control unit 39b activates the application program in the background based on the additional display data 44. The application program that has been activated or is activated in the background writes information such as the latest process result to the memory 37 at any time. The additional-display control unit 39b displays the information written to the memory 37 on the idle screen as additional information.

When a completion notice indicating completion of the process is made by an application program, the additional-display control unit 39b hides the additional information corresponding to the application program. The completion of the process includes, for example, a case in which the goal specified in the application program is achieved, a case in which the process related to specified data is completed to the end, and a case in which a specified period of time elapses.

Figure 4:
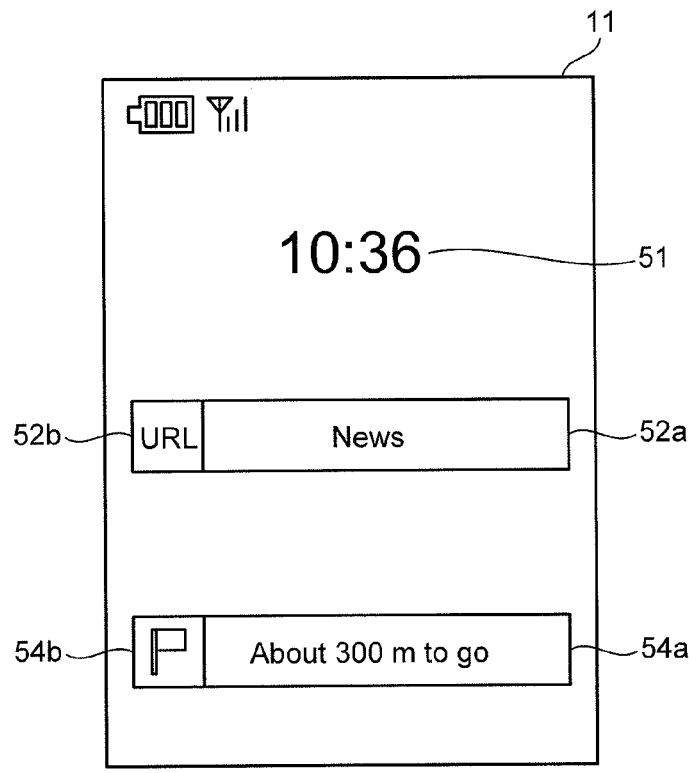
FIG. 4 is a diagram illustrating an example of the idle screen in which additional information is hidden when triggered by a completion notice.

FIG. 4 is a diagram illustrating an example of the idle screen in which additional information is hidden when triggered by the completion notice. When the number of steps counted by the pedometer program has reached the goal steps while the idle screen illustrated in FIG. 2 is displayed on the display unit 11, the completion notice is made by the pedometer program. The additional-display control unit 39b then hides the symbol 53b and the additional information 53a as illustrated in FIG. 4.

In this way, by hiding the additional information and the symbol corresponding to the application program whose process is completed, the user can easily recognize that the process of the application program that operates in the background is completed.

The movement determining unit 39c implements a function of determining whether the mobile phone 1 is moving based on the acceleration detected by the acceleration sensor 31. Specifically, it is determined that the mobile phone 1 is moving when a predetermined periodic change is repeated in the acceleration detected by the acceleration sensor 31. The case in which the mobile phone 1 is moving includes, for example, a case in which the user of the mobile phone 1 is walking, a case in which the user is running, and a case in which the user is driving a vehicle.

Figure 5:
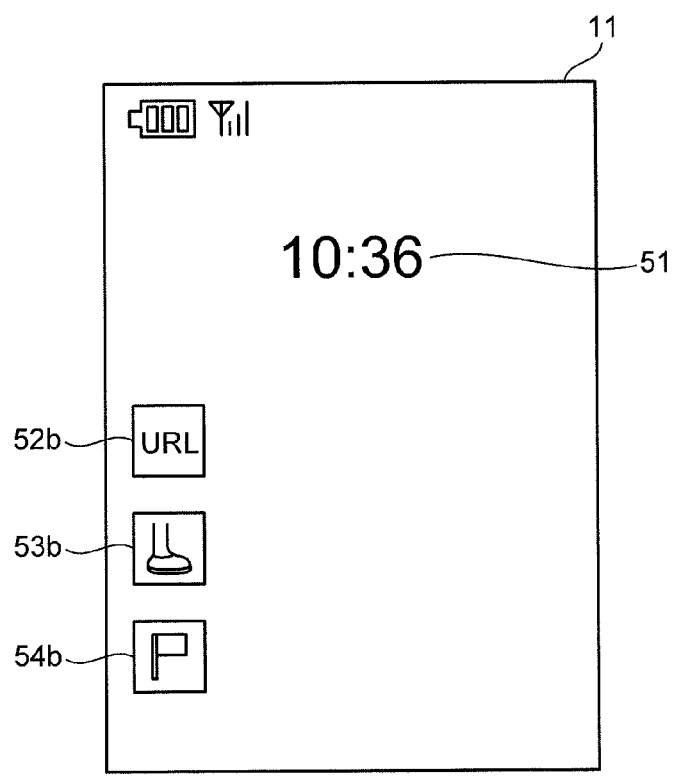
FIG. 5 is a diagram illustrating an example of the idle screen in which additional information is hidden when triggered by detecting that the mobile phone is moving.

When it is determined that the mobile phone 1 is moving, the movement determining unit 39c hides all pieces of additional information (text) displayed on the idle screen. FIG. 5 is a diagram illustrating an example of the idle screen in which the additional information is hidden when triggered by detecting that the mobile phone is moving. As illustrated in FIG. 5, by hiding the additional information with the symbols displayed, the user recognizes that the additional information is temporarily hidden.

In this way, when it is determined that the mobile phone 1 is moving, the additional information (text) is hidden, and this enables to prevent any dangerous act that the user is fixing his/her eyes on the content of a text of the additional information on the idle screen while walking and looks away despite his/her movement. In addition, the process of updating the screen is stopped in a period during which it is assumed that the user will not refer to the additional information (text), so that power saving can be achieved. Specifically, when the text of the additional information is kept displayed, information such as the steps being the text of the additional information is changed according to detection of the acceleration, and this requires frequent update of the display content of the display unit 11. Meanwhile, when only the symbols are kept displayed, even if information such as the steps is changed due to detection of the acceleration, the additional information i.e. the text such as the steps does not have to be displayed on the display. Therefore, there is no need to frequently update the display content of the display unit 11, and the number of re-drawings is thereby reduced, thus achieving the power saving.

The additional-display-data management program 40 implements registration of data in the additional display data 44, update of data, and deletion of data therefrom. Specifically, the additional-display-data management program 40 displays the function screen for registration or deletion of data in or from the additional display data 44 on the display unit 11. The additional-display-data management program 40 then registers or deletes the data based on the information input to the function screen.

The browser program 41 acquires a WEB page corresponding to a specified URL. The browser program 41 then displays the acquired WEB page on the display unit 11.

The pedometer program 42 implements a function of counting the number of steps of the user holding the mobile phone 1 based on the acceleration detected by the acceleration sensor 31. The information related to the steps counted by the function is written as pedometer data 37a to a predetermined area on the memory 37 at any time. The pedometer data 37a is read as needed by the function provided by the additional-display control unit 39b. The read pedometer data 37a is then displayed as additional information at a previously specified position on the idle screen.

The navigation program 43 implements a function of guiding the user holding the mobile phone 1 to a specified destination based on the current location specified by the base station to which the communication unit 32 is being connected or by the GPS receiver 34. The information related to the distance to the destination calculated by the function is written as navigation data 37b to a predetermined area on the memory 37 at any time. The navigation data 37b is read as needed by the function provided by the additional-display control unit 39b and is displayed as additional information at a predetermined specified position on the idle screen.

The additional display data 44 holds information related to additional information to be displayed on the idle screen. FIG. 6 is a diagram illustrating an example of the additional display data 44. As illustrated in FIG. 6, the additional display data 44 includes items such as ID, Display Position, Program, Additional Information, Status, Repetition, and Parameter. Registered in the additional display data 44 is data for each additional information to be displayed on the idle screen.

The item of ID holds an identification number for identifying data registered in the additional display data 44. The item of Display Position holds a position specified by the user upon registration or edit as a position on the idle screen where the additional information is displayed. For example, assuming that pieces of additional information are tightly arranged in a band-like manner on the idle screen, a position number corresponding to a position of each of the additional information in their positional order is set in the item of Display Position. It may be configured that the user can set an adjust position such as a position near to the center or near to the bottom edge according to the display content on the idle screen. The item of Program holds information for specifying an application program to be activated (e.g., a name or a path name of application program).

The item of Additional Information holds information indicating what to be displayed as additional information. For example, when a character string is fixedly displayed as additional information, the character string to be displayed is set in the item of Additional Information. When information, as additional information, related to a process for an application program that operates in the background is to be dynamically displayed, a specific value such as "<Dynamic>" is set in the item of Additional Information.

The item of Status holds information indicating how to display additional information. Set in the item of Status is any one of values, for example, "Symbol+Additional Information", "Symbol", and "Hidden". The "Symbol+Additional Information" indicates that both the symbol and the additional information are to be displayed. "Symbol" indicates that only the symbol is to be displayed and the additional information is to be hidden. "Hidden" indicates that both the symbol and the additional information are to be hidden.

The item of Repetition holds information indicating a period of newly redisplaying additional information. Set in the item of Repetition are values such as "Not Set", "Daily", "Weekly", and "Monthly". "Not Set" indicates that there is no need to newly redisplay the additional information. The value of "Daily", "Weekly", or "Monthly" indicates that the additional information has to be newly redisplayed each time a new day, week, or month starts, regardless of current display status of the additional information. The item of Parameter holds a parameter of an application program.

The value of the item of Repetition may be arbitrarily set by the user according to characteristics of the function provided by a corresponding program. For example, the navigation program 43 does not require display of information after arrival at the destination, and therefore "Not Set" is normally set in the item of Repetition of corresponding data. For the pedometer program 42, when user's routine is set to walk given goal steps every day, "Daily" is set in the item of Repetition of the corresponding data in order to save the same setting performed every day.

For first data of the additional display data 44 illustrated in FIG. 6, "1" is set in the item of ID, "3" is set in the item of Display Position, "Browser" is set in the item of Program, and "News" is set in the item of Additional Information. In this data, "Symbol+Additional Information" is set in the item of Status, "Not Set" is set in the item of Repetition, and "http://aaa.bbb/" is set in the item of Parameter.

This row indicates that the data is identified by an identification number "1" and that the character string "News" as additional information corresponding to the data is fixedly displayed at a "3"-rd position on the idle screen while displaying both the symbol and the additional information. This row also indicates that when the additional information displayed as "News" is selected and a predetermined operation is performed, the browser program 41 is activated using the URL "http://aaa.bbb/" as a parameter.

For second data of the additional display data 44 illustrated in FIG. 6, "2" is set in the item of ID, "4" is set in the item of Display Position, "Pedometer" is set in the item of Program, and "<Dynamic>" is set in the item of Additional Information. In this data, "Hidden" is set in the item of Status, "Daily" is set in the item of Repetition, and "10000 steps" is set in the item of Parameter.

This row indicates that the data is identified by an identification number "2" and that the information related to the number of steps counted by the pedometer program 42 is displayed as additional information corresponding to the data at a "4"-th position on the idle screen. This row also indicates that, for the additional information corresponding to the data, both the symbol and the additional information are currently hidden. This row further indicates that Goal Steps as "10000 steps" is specified as a parameter of the pedometer program 42 and that the additional information corresponding to the data is redisplayed each time a new day starts.

When the additional display data 44 is as illustrated in FIG. 6, for example, the idle screen as illustrated in FIG. 4 is displayed on the display unit 11 of the mobile phone 1.

Figure 7:
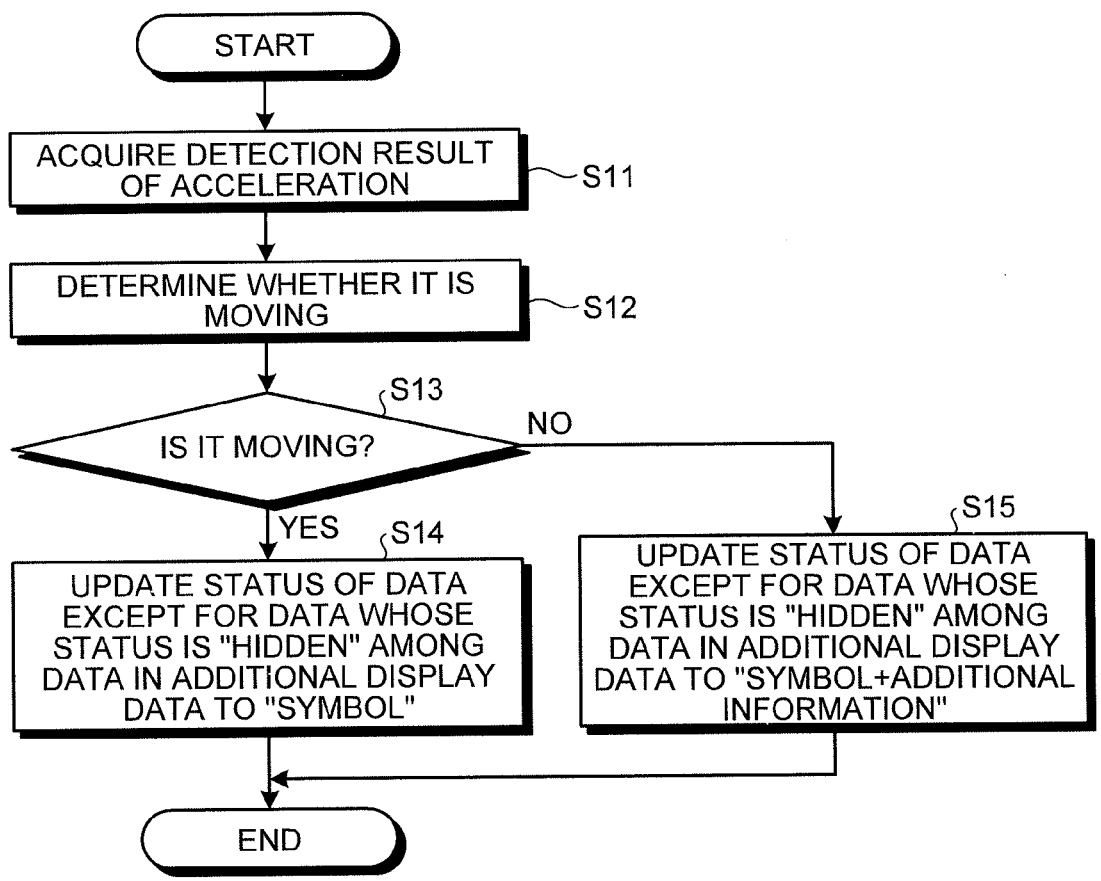
FIG. 7 is a flowchart illustrating a procedure executed by a controller based on a movement determining unit of a screen control program.

Then, operations of the mobile phone 1 in FIG. 1 will be explained below with reference to FIG. 7 to FIG. 9. FIG. 7 is a flowchart illustrating a procedure executed by the controller 36 based on the movement determining unit 39c of the screen control program 39. The procedure in FIG. 7 is repeatedly executed during display of the idle screen on the display unit 11 of the mobile phone 1.

As illustrated in FIG. 7, first of all, at Step S11, the controller 36 acquires a detection result of an acceleration from the acceleration sensor 31. Subsequently, at Step S12, the controller 36 determines whether the mobile phone 1 is moving based on the acquired acceleration.

When it is determined that the mobile phone 1 is moving (Yes at Step S13), then at Step S14, the controller 36 updates the values of the items of Status for any data, to "Symbol", other than the value of the item of Status which is "Hidden" among the data registered in the additional display data 44. This update allows the additional information corresponding to all the data, except for the data for which both the symbol and the additional information are hidden, to be hidden with the symbols displayed as illustrated in FIG. 5.

Meanwhile, when it is determined that the mobile phone 1 is not moving (No at Step S13), then at Step S15, the controller 36 updates the values of the items of Status for any data, to "Symbol+Additional Information", other than the value of the item of Status which is "Hidden" among the data registered in the additional display data 44. This update allows both the symbols and the additional information corresponding to all the data, except for the data for which both the symbol and the additional information are hidden, to be displayed as illustrated in FIG. 2 and FIG. 4. It goes without saying that, in this state, the display content of the additional information set in the additional display data 44 so as to dynamically change the display content is updated as needed.

Figure 8:
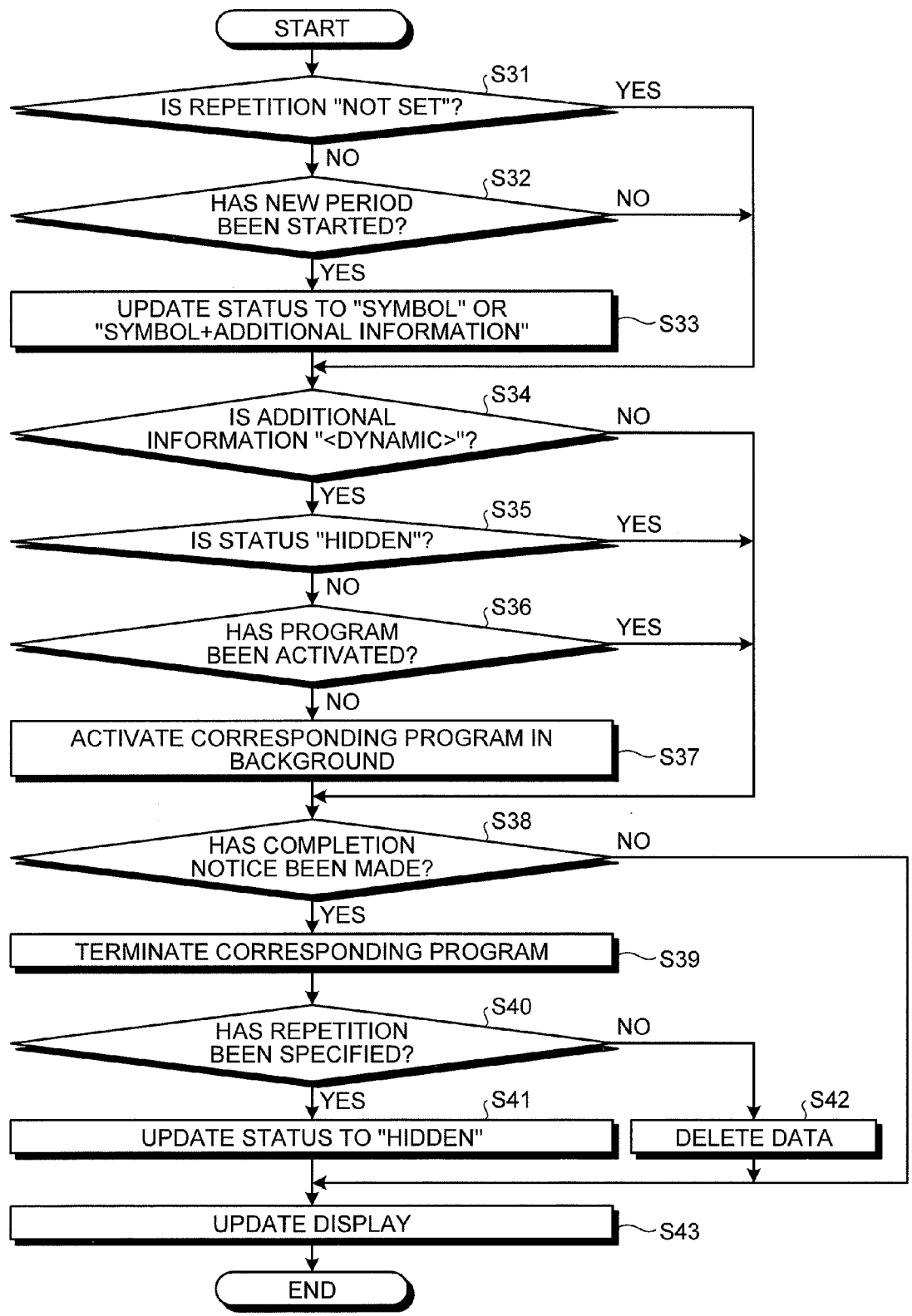
FIG. 8 is a flowchart illustrating a procedure executed by the controller based on an additional-display control unit of the screen control program.

FIG. 8 is a flowchart illustrating a procedure executed by the controller 36 based on the additional-display control unit 39b of the screen control program 39. The procedure in FIG. 8 is repeatedly executed for each data registered in the additional display data 44 during display of the idle screen on the display unit 11 of the mobile phone 1.

As illustrated in FIG. 8, first of all, at Step S31, the controller 36 determines whether the value of the item of Repetition for the data registered in the additional display data 44 is "Not Set", i.e. whether there is setting related to a period of Repetition in the data. When the value of the item of Repetition is not "Not Set", i.e. when there is setting related to a period of Repetition (No at Step S31), then at Step S32, the controller 36 determines whether the period represented by the value set in the item of Repetition has newly started.

For example, when "Daily" is set in the item of Repetition, the controller 36 determines that the period is newly started when the time reaches 0:00 each day. When "Monthly" is set in the item of Repetition, the controller 36 determines that the period is newly started when the time reaches 0:00 on the first day of each month. When data that has setting related to a period of Repetition is newly registered, the controller 36 also determines that the period is newly started. The user may set the time as a beginning of one day to any time after 0:00.

When it is determined that the period has been newly started (Yes at Step S32), then at Step S33, the controller 36 updates the value of the item of Status for the data to either "Symbol" or "Symbol+Additional Information". This update allows at least the symbol, among the symbol and the additional information, corresponding to the data to be displayed.

Whether to update the value of the item of Status for the data to either "Symbol" or "Symbol+Additional Information" is preferably performed based on the detection result of the moving status. Specifically, when it is determined, by the function provided by the movement determining unit 39c, that the mobile phone 1 is moving, the controller 36 preferably updates the value to "Symbol", while when it is determined that the mobile phone 1 is not moving, the controller 36 preferably updates the value to "Symbol+Additional Information". In order to simplify the process, the value may always be updated to either one of the values.

When the value of the item of Repetition is "Not Set" at Step S31 (Yes at Step S31) or when it is determined that the period has not been newly started at Step S32 (No at Step S32), the value of the item of Status for the data is not updated.

Subsequently, at Step S34, the controller 36 determines whether the value of the item of Additional Information for the data is "<Dynamic>", i.e. whether the information related to the process of the application program is displayed as additional information.

When the value of the item of Additional Information for the data is "<Dynamic>", i.e. when the information related to the process of the application program is displayed as additional information (Yes at Step S34), then at Step S35, the controller 36 determines whether the value of the item of Status for the data is "Hidden". When the value of the item of Status for the data is not "Hidden" (No at Step S35), then at Step S36, the controller 36 checks whether the application program specified in the item of Program for the data has been activated.

When the application program specified in the item of Program for the data has not been activated (No at Step S36), then at Step S37, the controller 36 activates the application program in the background. At this time, the controller 36 specifies the value set in the item of Parameter for the data as a parameter for the application program. When the value of the item of Additional Information is not "<Dynamic>" (No at Step S34), or when the value of the item of Status is "Hidden" (Yes at Step S35), or when the application program has been activated (Yes at Step S36), then the controller 36 does not activate the application program.

Subsequently, at Step S38, the controller 36 determines whether the completion notice has been made by the application program specified in the item of Program for the data. When the completion notice has been made (Yes at Step S38), then at Step S39, the controller 36 terminates the application program specified in the item of Program for the data.

After the termination of the application program, the controller 36 hides both the additional information and the symbol corresponding to the data. Specifically, when a period of Repetition has been specified in the item of Repetition for the data (Yes at Step S40), it is necessary to redisplay additional information or so corresponding to the data. Therefore, at Step S41, the controller 36 updates the value of the item of Status for the data to "Hidden", to thereby hide the additional information or so.

Meanwhile, when a period of Repetition has not been specified in the item of Repetition for the data (No at Step S40), there is no need to redisplay additional information or so corresponding to the data. Therefore, at Step S42, the controller 36 deletes the data to hide the additional information or so. When the completion notice has not been made (No at Step S38), the update of the additional display data 44 to hide the additional information or so is not performed.

After the completion of the above-described procedure, at Step S43, the controller 36 updates the display of the additional information and the symbol corresponding to the data on the idle screen based on the latest content of the data.

FIG. 9 is a sequence diagram illustrating an operation of the mobile phone 1 when information related to the process of the pedometer program 42 is displayed as the additional information on the idle screen. First of all, at Step S51, the controller 36 registers the data to be displayed as additional information on the idle screen in the additional display data 44 based on the information input by the user to the function screen provided by the additional-display-data management program 40. It is assumed in this case that "Daily" is set in the item of Repetition, "10000 steps" is set as goal steps in the item of Parameter, and a certain position is set as a display position.

The function of registering data in the additional display data 44 may be separately provided by programs, such as the pedometer program 42 and the navigation program 43, associated with additional information displayed on the idle screen. In this case, for example, when wishing to display information related to steps as additional information on the idle screen, the user activates the pedometer program 42. The user then inputs information to the function screen provided by the pedometer program 42 to thereby register the data in the additional display data 44.

Subsequently, the controller 36 executes the following processes based on the function provided by the additional-display control unit 39b. First of all, at Step S52, the controller 36 acquires the data registered at Step S51 from the additional display data 44. Then at Step S53, the controller 36 updates the value of the status of the data to "Symbol+Additional Information" (or "Symbol"). Furthermore, when the pedometer program 42 is not activated yet, then at Step S54, the controller 36 activates the pedometer program 42 specified in the item of Program for the data in the background while specifying the goal steps set in the item of Parameter for the data.

The controller 36 repeatedly executes the following processes based on the function provided by the pedometer program 42. First of all, at Step S55, the controller 36 acquires an acceleration from the acceleration sensor 31. Then at Step S56, the controller 36 counts the number of steps of the user based on the acquired acceleration, and writes the information related to the counted steps to the pedometer data 37a.

The controller 36 repeatedly executes the following processes based on the function provided by the additional-display control unit 39b. First of all, at Step S57, the controller 36 acquires the data registered at Step S51 from the additional display data 44. Because "<Dynamic>" is set in the item of Additional Information for the data, at Step S58, the controller 36 acquires the pedometer data 37a, and at Step S59, displays the symbol and the additional information based on the acquired pedometer data 37a on the display unit 11.

The controller 36 repeatedly executes Step S55 to Step S59, so that the display unit 11 displays the information related to the latest counted steps as the additional information on the idle screen in a superimposed manner.

It is assumed here that the user of the mobile phone 1 starts moving. In this case, the controller 36 executes the following processes based on the function provided by the movement determining unit 39c. First of all, at Step S60, the controller 36 acquires an acceleration from the acceleration sensor 31, and detects that the mobile phone 1 is moving based on the acquired acceleration. Then at Step S61, the controller 36 updates the value of the item of Status for the data registered in the additional display data 44 at Step S51 to "Symbol".

Moreover, the controller 36 executes the following processes based on the function provided by the additional-display control unit 39b. First of all, at Step S62, the controller 36 acquires the data registered at Step S51 from the additional display data 44. Because "Symbol" is set in the item of Status for the data, at Step S63, the controller 36 hides the additional information based on the acquired pedometer data 37a and displays only the symbol on the display unit 11.

The controller 36 executes Step S60 to Step S63, so that the display unit 11 displays only the symbol on the idle screen in a superimposed manner.

Thereafter, it is assumed that the user of the mobile phone 1 stops moving. In this case, the controller 36 executes the following processes based on the function provided by the movement determining unit 39c. First of all, at Step S64, the controller 36 acquires an acceleration from the acceleration sensor 31, and detects that the mobile phone 1 is not moving based on the acquired acceleration. Then at Step S65, the controller 36 updates the value of the item of Status for the data registered in the additional display data 44 at Step S51 to "Symbol+Additional Information".

The controller 36 repeatedly executes the following processes based on the function provided by the pedometer program 42 whose execution is resumed. First of all, at Step S66, the controller 36 acquires an acceleration from the acceleration sensor 31. Then at Step S67, the controller 36 counts the number of steps of the user based on the acquired acceleration, and writes the information related to the counted steps to the pedometer data 37a.

Moreover, the controller 36 executes the following processes based on the function provided by the additional-display control unit 39b. First of all, at Step S68, the controller 36 acquires the data registered at Step S51 from the additional display data 44. Because "<Dynamic>" is set in the item of Additional Information for the data, at Step S69, the controller 36 acquires the pedometer data 37a, and at Step S70, displays the symbol and the additional information based on the acquired pedometer data 37a on the display unit 11.

The controller 36 repeatedly executes Step S66 to Step S69, so that the display unit 11 redisplays the information related to the latest counted steps as the additional information on the idle screen in a superimposed manner.

Thereafter, when the steps of the user reach the goal steps, the following processes are executed. The controller 36 executes the following processes based on the function provided by the pedometer program 42. First of all, at Step S71, the controller 36 acquires an acceleration from the acceleration sensor 31. Then at Step S72, the controller 36 counts the number of steps of the user based on the acquired acceleration, and issues a completion notice when it is determined that the counted steps exceed the goal steps.

The controller 36 executes the following processes based on the function provided by the additional-display control unit 39b. First of all, at Step S73, the controller 36 terminates execution of the pedometer program 42 based on the issued completion notice. Then at Step S74, the controller 36 updates the value of the item of Status for the data registered in the additional display data 44 at Step S51 to "Hidden". At Step S75, the controller 36 then hides the symbol and the additional information corresponding to the data.

The controller 36 executes Step S71 to Step S75, so that the display unit 11 stops to display the symbol and the additional information corresponding to the pedometer program 42 as illustrated in FIG. 4. The controller 36 re-executes Step S52 and subsequent steps on the next day, to thereby redisplay the symbol and the additional information corresponding to the pedometer program 42 on the display unit 11.

As explained above, the present embodiment is configured to display the information related to the process being executed by the program that is executed in the background as additional information on the idle screen in a superimposed manner, thus providing useful information to the user with the idle screen displayed.

The configuration of the mobile phone 1 according to the present embodiment can be modified within a scope that does not depart from the gist of the present invention. For example, in the example, the function of determining whether the mobile phone 1 is moving is provided in the screen control program 39; however, this function may be implemented by some other program.

For the pedometer program 42, waking distance or calories used by walking may be displayed as information related to the steps, or may be set as a goal. In this case, parameters such as a user's height required to determine the waking distance or the used calories may be previously stored in the storage unit 38.

For the navigation program 43, an address or a latitude and a longitude of the current location may be displayed as additional information. Moreover, for the navigation program 43, a map specifying the current location may be displayed as additional information on the idle screen in a superimposed manner.

Information related to any application program other than the pedometer program 42 and the navigation program 43 may be displayed as additional information. For example, a reproduction program for reproducing music data is activated in the background, and a song title of the music data being reproduced by the reproduction program may be displayed as additional information on the idle screen in a superimposed manner.

The embodiment is configured to display additional information on the idle screen in a superimposed manner; however, the additional information may be displayed on any screen other than the idle screen, i.e. on the function screen in a superimposed manner. In this case, whether the additional information is displayed in a superimposed manner may be changed according to the function screen displayed on the display unit.

The invention claimed is:

1. An electronic device, comprising:
a display unit; and
a control unit configured to
acquire information related to a process of an application program being executed in background,
execute an operation repeatedly to display the acquired information as additional information on the display unit,
determine a number of steps of a user of the electronic device as the additional information, and
hide the additional information when the determined number of steps reaches a preset value.

2. The electronic device according to claim 1, wherein the control unit is configured to
determine whether the electronic device is moving, and
hide the additional information, upon determining that the electronic device is moving.

3. The electronic device according to claim 2, further comprising an acceleration sensor, wherein
the control unit is configured to determine that the electronic device is moving when a predetermined periodic change is repeated in an acceleration detected by the acceleration sensor.

4. The electronic device according to claim 3, wherein the control unit is configured to
determine the number of steps of the user of the electronic device based on the acceleration detected by the acceleration sensor, and
display, upon determining that the electronic device is not moving, the number of steps as the additional information on the display unit.

5. The electronic device according to claim 2, wherein the control unit is configured to redisplay the additional information upon determining that the movement of the electronic device is ended.

6. The electronic device according to claim 2, wherein the control unit is configured to update display of the additional information for each preset period.

7. The electronic device according to claim 1, wherein, when the display unit displays a wallpaper,
the control unit is configured to display the additional information on the display unit by superimposing the additional information on the wallpaper.

8. The electronic device according to claim 7, wherein, upon determining that movement of the electronic device is started while the additional information and a symbol associated with the additional information are displayed as being superimposed on the wallpaper,
the control unit is configured to hide the additional information and continue to display the symbol.

9. A screen control method executed by an electronic device having a display unit, the screen control method comprising:
acquiring information related to a process of an application program being executed in background;
executing an operation repeatedly to display the acquired information as additional information on the display unit;
determining a number of steps of a user of the electronic device as the additional information; and
hiding the additional information when the determined number of steps reaches a preset value.

10. A non-transitory storage medium that stores a screen control program for causing, when executed by an electronic device having a display unit, the electronic device to execute:
acquiring information related to a process of an application program being executed in background;
executing an operation repeatedly to display the acquired information as additional information on the display unit;
determining a number of steps of a user of the electronic device as the additional information; and
hiding the additional information when the determined number of steps reaches a preset value.

* * * * *